Figure 1:
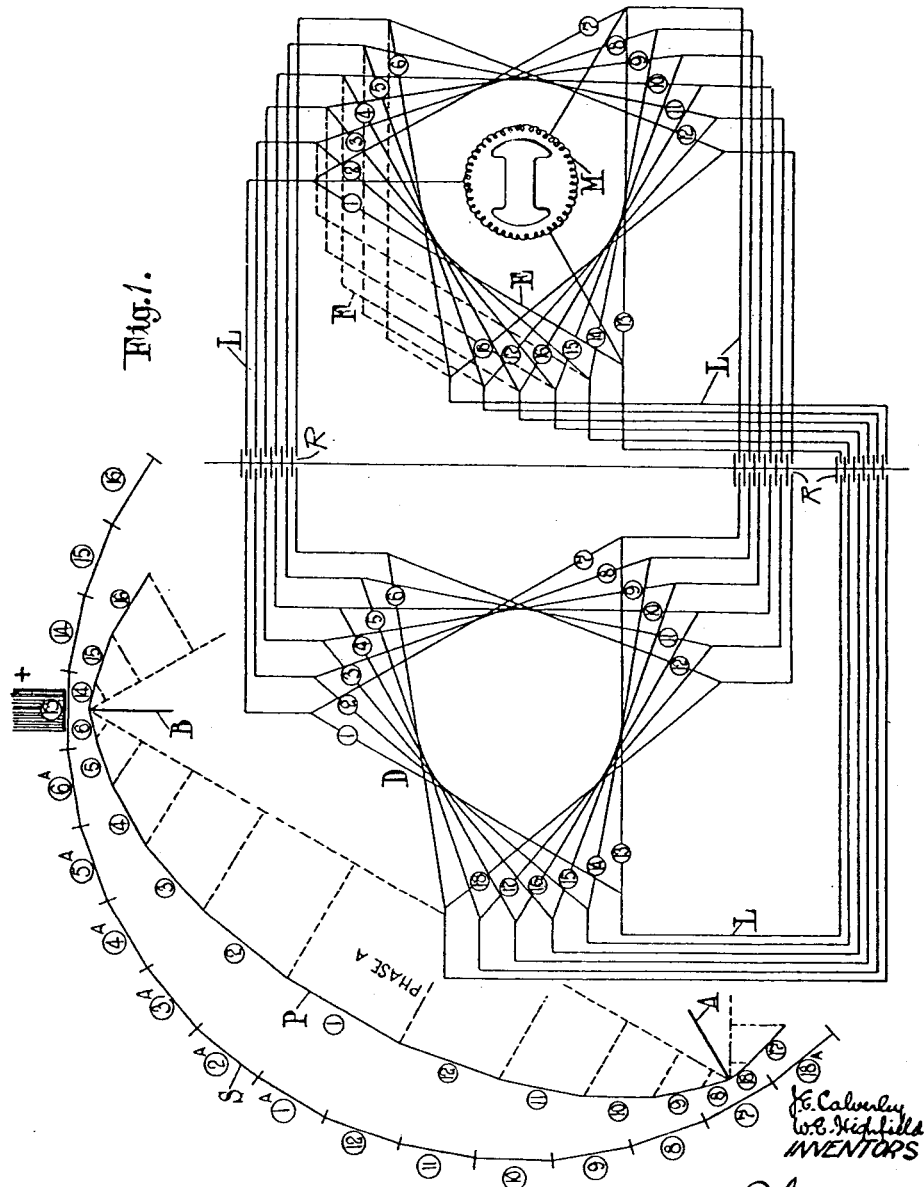

April 24, 1928.  1,667,242

J. E. CALVERLEY ET AL

ELECTRIC CONVERTING APPARATUS

Filed Nov. 12, 1925  3 Sheets-Sheet 1

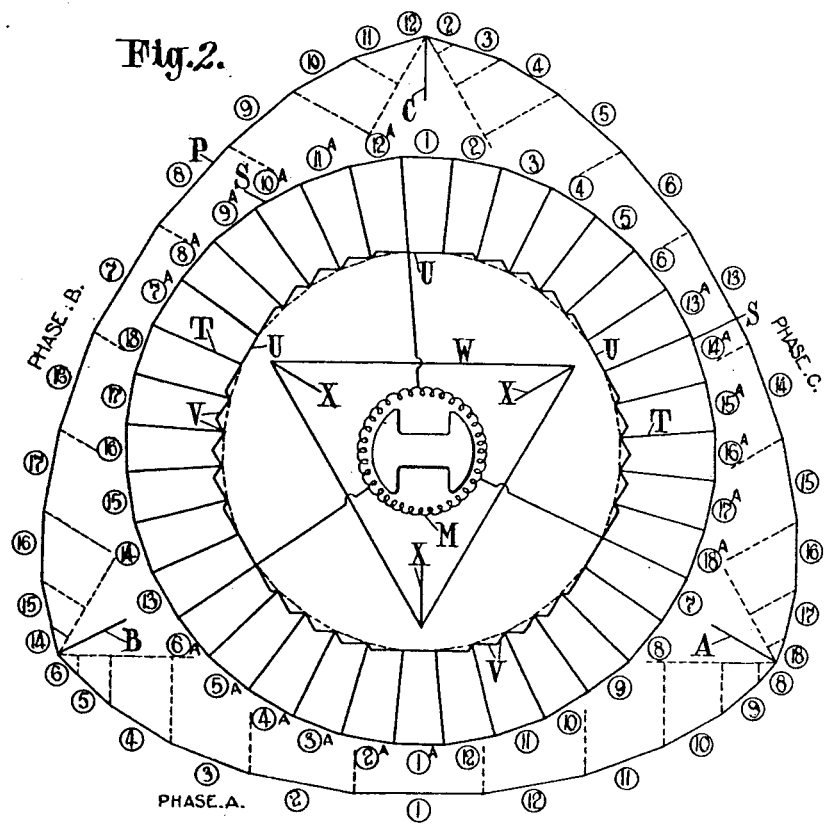

April 24, 1928.
J. E. CALVERLEY ET AL
1,667,242
ELECTRIC CONVERTING APPARATUS
Filed Nov. 12, 1925
3 Sheets-Sheet 3
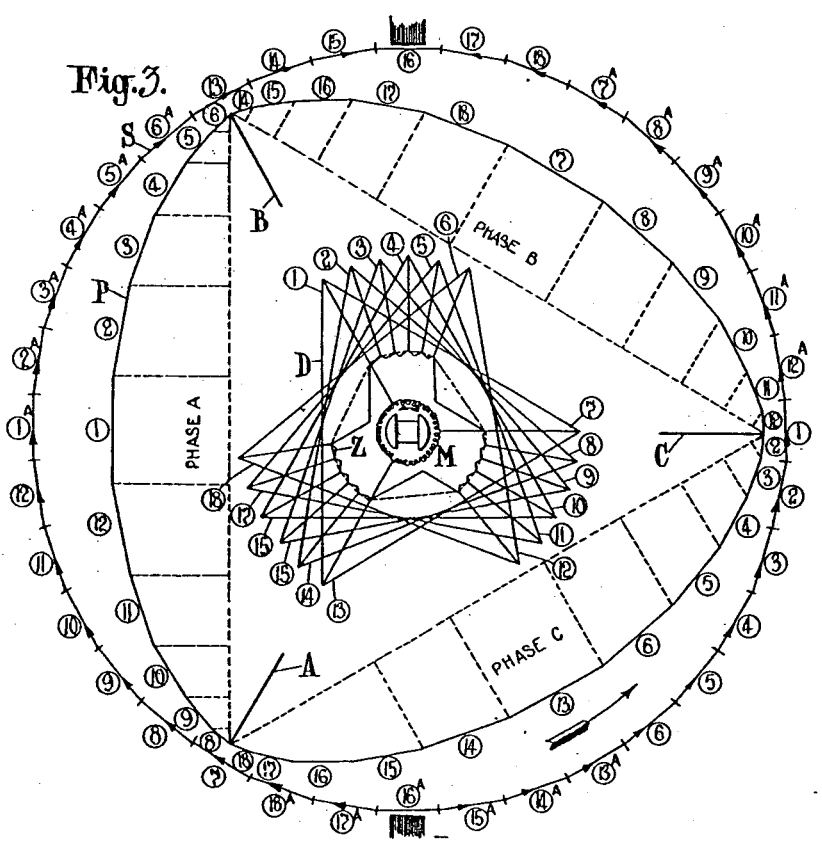

Patented Apr. 24, 1928.

1,667,242

UNITED STATES PATENT OFFICE.

JOHN EARNSHAW CALVERLEY, OF PRESTON, AND WILLIAM EDEN HIGHFIELD, OF LONDON, ENGLAND, ASSIGNORS TO THE ENGLISH ELECTRIC COMPANY LIMITED, OF LONDON, ENGLAND.

ELECTRIC CONVERTING APPARATUS.

Application filed November 12, 1925, Serial No. 68,588, and in Great Britain December 10, 1924.

This invention relates to apparatus used for conversion from alternating current to direct current or vice versa of the kind in which a normal polyphase system generally of a relatively small number of phases, for instance, three, is associated through the medium of a number of transformer cores with another polyphase system which may be of a materially higher number of phases and is connected to commutating gear and thereby to a direct current system. For convenience of discussion the alternating current system first mentioned above will be spoken of as the primary system and the other system will be spoken of as the secondary system, these terms being used for the purpose of distinguishing the system rather than for the purpose of indicating their functions.

For this purpose of association with the commutating gear the windings forming the secondary system are arranged to form a symmetrical closed ring winding from which are taken at approximately equi-distant points a set of tappings leading to commutator segments. In general these segments are stationary and commutation is effected by the rotation of brushes, the movement of which has to be synchronized with the alternation of current in the secondary system.

Apparatus of the kind above referred to is described in the following specifications:— British Patent No. 140,853, United States Patents Nos. 1,580,554 and 1,567,032, and British Patent No. 184,259. It has also been described in technical journals under the name of "Transverter", see for instance, "Engineering" published in London May 2nd 1924.

The object of the present invention is to attain and maintain stable working of such apparatus by providing at all times a balance of ampere turns acting on each transformer core without distortion or disturbance of the flow of current either in the alternating or direct current circuits of the apparatus.

The invention will be further described by the aid of the accompanying drawings Figures 1–3 which show diagrammatically practical embodiments of it. These embodiments all refer to an example of the apparatus which is described in the more recent of the publications mentioned above in which the alternating or primary system consists of three phases and the secondary system consists of thirty-six phases, the transformation being effected by means of eighteen cores. These eighteen cores (not shown in the accompanying drawings) are assumed to be numbered 1–18 and these numbers enclosed in circles and the same numbers with the index letter A are used to indicate winding sections each of which is either located on the core the number of which it bears or is directly related to a winding mounted thereon as will be explained hereinafter.

The three figures of the drawings have similar diagrammatic characteristics which may be most readily introduced by reference to Figure 3. In this the secondary winding is indicated vectorially by a thirty-six sided polygon S forming the outer part of the diagram, the positions of the positive and negative brushes for the direct current in relation to this winding are shown, the brushes being located at the top and bottom of the diagram respectively. Each of the thirty-six sections of this winding comprises the same number of turns and two sections are located on each of the cores as is indicated by the occurrence in the thirty-six sided polygon S of eighteen pairs of sides, the members of each pair being located diametrically opposite to each other and one having a reference numeral, for instance, 1, and the other the same numeral with the index letter A. The phase relationship of the sections of the secondary winding is shown by the angular relationships of the sides of the polygon and by the arrow heads applied to them. The form of the diagram as a thirty-six sided equi-lateral polygon indicates that the secondary windings are connected end to end to form a closed ring winding in each section of which is an alternating electro-motive force equal in magnitude with that in each of the other sections, the phase difference between adjacent sections being constant throughout the ring which is therefore electrically symmetrical. In this connection it is pointed out that while the arrow heads on corresponding windings on the two sides of the diagram, for instance, 1 and 1ᴬ point in parallel directions, that is, vertically upward in the case mentioned, these two sections are actually in opposition of phase as shown by the fact that they oppose each other around the closed circuit formed by the secondary winding. In each half of this winding (considering it to be divided by the brushes into two halves) there is found a section having an electric-motive force equal in magnitude and opposite in phase to each of the sections in the other half. This of course is an essential for a direct current winding which in effect this secondary winding is.

In the same way that the external polygon S shows vectorially the phase and magnitude of the voltage developed in the secondary winding the intermediate figure P shows the voltage conditions in the primary system which is here shown as a delta connected system having the terminals A, B and C. The voltage applied to the terminals A, B and C from the external supply is indicated in each case by the broken line forming one side of the triangle which is the inner part of the figure P. The outer part of this figure is formed by vectors indicating the back E. M. F.'s produced in the sections of the primary windings which are arranged in series in each phase, the location of the winding on a transformer core being indicated by the application to it of the number of that core.

The eighteen cores of the transformers are arranged in six three-phase groups and accordingly the primary windings of any one of the groups must be so arranged as to give a three-phase relationship between the flux in its cores. This can be done by an appropriate selection of the number of turns from the different primary phases applied to each core. It will be seen by reference to the figure P that one three-phase group of cores 1, 7 and 13 is provided with a single primary winding on each core while every other core has its primary winding formed of two sections from different phases. Accordingly, each primary phase comprises windings connected in series on eleven cores and on ten of these cores there are also located sections of windings connected into one of the other two phases. It will be understood that of each of these ten cores the relation between the number of turns of the two primary sections must be so adjusted as to give a resultant effect appropriate to the particular phase of the secondary system with which the core is associated. The manner in which this can be done is made clear by the publications hereinbefore mentioned.

The order of arrangement of the vectors forming the boundary of the figure P does not necessarily show the sequence in which the winding sections are connected. That sequence is determined mainly by the practical conditions for making the connections between the cores. The sections of the outer part of the figure P are grouped so as to be symmetrical and to be parallel with the corresponding sections of the secondary winding of the figure S. It will be noted that the vectors forming the outer part of the figure P are of unequal length. This is of course due to the fact that the number of turns of each section of the primary winding varies from core to core.

In Figure 1 a similar showing of the secondary and primary windings of the main transformers has been adopted but part has been broken away for convenience in setting out the other features which it is desired to make clear by this figure. There is also the further difference that the conditions assumed in Figure 1 are those which exist at a slightly earlier phase position than that of Figure 3, phase 13 of the secondary winding being in the position for commutation in Figure 1 and phase 16 being in that position in Figure 3.

In Figure 2 the primary winding diagram P has been drawn outside the secondary diagram S and portions of the former have been broken away to accommodate the latter. The brushes also have been omitted.

When conversion apparatus of this type is working, the primary winding or windings P on each transformer core will under the most satisfactory conditions of operation carry a current which has a wave form approximately sinusoidal. Assuming that the load on the direct current side of the apparatus is steady, there will flow through the brushes a current of constant value and this will be transformed by commutation into an alternating current having a wave form which is approximately rectangular. To attain and maintain the conditions just indicated of a sine current wave shape in the primary winding and a rectangular current wave shape in the leads to the commutator segments, it is necessary to deal with the difficulty that if the wave shape of the current in the secondary windings S on each transformer core corresponds to the wave form of the current in the connections between those sections of the secondary winding and the commutator segments, there will not occur at each instant a balance of ampere turns on the core due to the action of these two windings. By the present invention the difficulty is dealt with by providing a bye-pass circuit for each section of the secondary winding, this circuit having such characterisites that it permits the passage of a current having a wave form substantially equal to the difference between the sinusoidal wave and the rectangular wave previously mentioned. At the same time the bye-pass circuit opposes considerable impedance to the passage of the sine wave of the fundamental frequency. By this means a balance of ampere turns at all points in the cycle exists at each transformer core and thereby distortion of the wave forms of both currents and E. M. F. in the secondary circuit which would otherwise occur is avoided.

The bye-pass circuits may be coupled with the secondary winding either directly, that is, by conductive means, or inductively. Figure 2 shows an example where conductive coupling is employed. If we consider in connection with this figure core No. 1 of the transformer arrangement, we see that in accordance with the preceding description it has on it a primary coil P indicated by 1 and two secondary coils S indicated by 1 and 1^A. With each of the latter is connected by means of tappings T (taken off at the junctions between the coils 1 and 1^A and the adjacent sections of the secondary winding) a section U of the bye-pass winding. Every other section of the secondary winding S also has a bye-pass winding similarly associated with it by means of the tappings T. There are accordingly thirty-six groups of coils in the bye-pass winding, corresponding to the thirty-six sections of the secondary winding. Of these thirty-six groups, six indicated by U consist of a single coil. Each of the other thirty groups consists of two parts. These two parts are indicated by the two lines V between adjacent tappings T, their resultant being shown by a broken line.

It will be seen that we have provided in conductive connection with each section of the secondary winding a bye-pass winding U or group of windings V so that current can flow through the bye-pass circuit to the commutator without passing through the secondary winding. It will therefore be seen that we have provided circuits which permit of a current of sine wave form in the primary winding or windings of a core to be balanced at each instant, as regards the ampere turns produced, by the current flowing in the sections of the secondary winding on that core whole current of rectangular wave form is being taken through the commutator connectors to the direct current terminals of the apparatus. The secondary winding sections then must carry current of sine wave form and the bye-pass circuit must carry a current having a wave form substantially equal to the difference between the sinusoidal wave and the rectangular wave. It remains to be shown how the secondary winding sections and the bye-pass winding sections respectively are made selective as regards the current wave forms so as to obtain an appropriate division of the commutated direct current between them. To recognize what this implies it must be remembered that the rectangular wave of current if formed of a fundamental sine wave of the same frequency as the primary current and an infinite series of harmonics the amplitudes of which decrease rapidly as their frequency increases. The result to be attained therefore is the division of the commutated direct current in such a way that the fundamental sine wave passes through the secondary winding S while the harmonics are bye-passed through the winding sections U and V. The passage of the bye-pass current represents a certain amount of electrical power and it is necessary therefore to provide means for giving to and taking from the secondary circuit by way of the bye-pass circuits the amount of energy represented at each instant by the harmonic current which it is desired to bye-pass. Since, however, the total power represented by the currents in all the bye-pass circuits of the apparatus at any instant is zero, this requirement may be met by arranging means for transferring energy between the several winding sections U and V of the bye-pass circuits.

This is carried out according to the present invention by forming the bye-pass circuits of windings arranged in an appropriate manner on the cores of a transformer or a group of transformers. The arrangement of this part of the apparatus which is shown in Figure 2 of the accompanying drawings is one in which a three-phase transformer is used having on each of its cores bye-pass circuits so formed as regards their respective number of turns and so grouped as regards their respective phases in the secondary system that the total number of ampere turns on any one core at any instant is approximately zero. The three-phase arrangement of the cores (although these are not shown) will be recognized from a consideration of that part of the diagram which shows the bye-pass windings U, V. It will be seen that all the lines indicating these windings are drawn parallel to three directions, namely, the horizontal direction and two directions at 120° thereto. It is to be understood that the direction of these lines shows which of the three cores the winding sections are mounted on and the lengths of the lines indicate the proportionate number of turns in the section. The grouping and dimensioning (as regards number of turns) of the individual sections of this winding of the auxiliary transformer will be seen to be similar to those employed for the primary windings of the main transformers except that each section is duplicated in the case of the bye-pass winding so as to provide a thirty-six phase arrangement corresponding to the thirty-six phases of the secondary winding S. In the case of the primary windings of the main transformers a three-phase supply is distributed over eighteen cores, being for that purpose changed to an eighteen phase system, three phases of which correspond with the phases of the external primary system and each are formed by a single coil, while the other fifteen are uniformly distributed over the phase angles between these three phases and are each formed by two coils. This distribution of the primary windings is clearly set out in the prior publications hereinbefore referred to. In the bye-pass system the thirty-six phase bye-pass winding is changed at the auxiliary transformer into a three-phase system by means of sixty-six coils, six of which marked U form a single winding section while the other sixty are grouped in two's to form the remaining thirty sections. The formation and grouping of coils on the three cores of the auxiliary transformer in the manner just described produces the desired result previously referred to, namely, that the total number of ampere turns on any one core due to the bye-pass current at any instant is approximately zero.

The manner in which the commutated direct current is caused to divide itself between the bye-pass and the secondary windings can now be recognized from the following considerations. Since the secondary winding on the main transformer core is linked by that core with a primary winding which is adapted to give out and receive energy, represented by current of fundamental frequency but not to any great extent by current of harmonic frequencies, the tendency will be for the component of fundamental frequency in the secondary current to flow through the winding on the main transformer. On the other hand, on the auxiliary transformer, there is no provision for the absorption or giving out of an amount of energy represented by current of the fundamental frequency at a rate commensurate to that at which energy of this kind is passing through each section of the secondary system, while there exists due to the interlinking of the bye-pass windings provision for absorbing and giving out energy represented by all the harmonic currents. The result of this is seen to be that the harmonic components of the secondary current will tend to restrict themselves to the bye-pass circuit while only a small part of the current of fundamental frequency will flow through that circuit.

It will be seen therefore that the main transformer secondary winding provides a path of low impedance to currents of fundamental frequency and of high impedance to currents of harmonic frequency while in the bye-pass winding on the auxiliary transformer the opposite conditions exist.

Since the inter-action between the harmonic currents in the bye-pass circuits grouped on a transformer core can be made so as to reduce to zero or to a small value at each instant the resultant ampere turns due to the harmonics, without giving a similar action as regards the fundamental frequency, the flux wave existing in the main and the auxiliary transformer cores will have substantially a sine form of fundamental frequency so that the action of the bye-pass circuits may also be considered as the action of a wave filter for protecting the main transformer core form harmonic fluxes, that is, for maintaining in that core an approximation to a sine wave of flux.

The foregoing description of the division effected between fundamental and harmonic currents may require modification in certain cases where the circuit conditions are not precisely as assumed. For instance, some one or more of the sets of windings on the main transformer cores may be interconnected in such a way as to offer low impedance to the flow of currents of frequencies which are three times or multiples of three times the fundamental frequency. This would be the case if additional closed ring windings of the kind set out in the specification of our Patent No. 1,567,032 are provided. Such a supplementary winding forms a closed circuit linked only with all the cores of one of the polyphase transformers. This closed winding will be capable of transferring by inductive action from the windings on one core to those on the other cores energy corresponding to currents of harmonic frequency which in the case of a three-phase transformer will be of triple frequency and of frequencies which are multiples of three times the fundamental. This transfer of energy will involve the presence on the cores of ampere turns due to the additional winding which will be balanced by ampere turns of the secondary windings which for this purpose will carry current of the appropriate harmonic frequencies. This will have the effect of reducing the impedance of the secondary windings to harmonic currents of these frequencies so that such currents will divide themselves between both the secondary windings and the by-pass windings or be retained in the secondary windings.

The commutating gear of this apparatus is driven by a synchronous motor and it is a feature of the present arrangement that this motor should be connected with the bye-pass circuits. The armature winding of this motor is indicated diagrammatically by M and it will be seen that in Figure 2 it is connected to three points spaced 120 electrical degrees apart on the closed ring winding formed by the bye-pass circuits. By this connection the armature winding serves to provide additional bye-pass paths for any residual harmonic currents which cannot be completely dealt with by the windings U, V. The arrangement will also have the advantage of assisting in the maintenance of the appropriate phase relationship between the various parts of the winding on that transformer and the correction of any slight want of symmetry in the potential relation of the tapping points. Irregularities of the kind indicated may occur due to the difficulty of splitting up the primary system into sections each comprising an appropriate number of turns owing to the fact that fractions of turns cannot of course be employed. An additional three-phase winding W forming a delta which is connected to the three-phase supply by the leads X is arranged on the auxiliary transformer. This serves to supply energy to the synchronous motor during starting. During running the energy for the motor may be supplied from the main transformers through the secondary winding and the connections between this winding, the bye-pass windings and the armature winding M. If, however, the winding W is left in circuit with the mains during the running of the apparatus, it provides an alternative path for feeding the motor.

In many cases, instead of the direct coupling of the bye-pass windings with the secondary windings, it will be preferable to use an inductive connection. Examples of this are shown in Figures 1 and 3. Referring particularly to Figure 1 it will be seen that there are provided additional windings D which are spoken of as "compensating coils." Each one of these coils is mounted on one of the main cores, (the coil indicated by 1 being on the transformer core 1) which, as previously indicated, carries one or two primary windings as the case may be and two secondary windings (corresponding for instance to the vectors 1 and 1^A). As shown in Figure 1 the compensating coils D are grouped to form six deltas so that these windings are capable of acting as a low impedance path for harmonics of three times and multiples of three times the fundamental frequency so that these compensating coils take the place of the additional windings previously referred to in connection with our Patent No. 1,567,032. The compensating coils are connected through the wires L with windings mounted on the auxiliary transformer. These windings form a series of deltas indicated vectorially by E which correspond with the six deltas formed by the compensating coils. It is to be noted, however, that the actual arrangements of the coils forming these two sets of deltas is not the same. In the case of the compensating coils we have eighteen similar coils each arranged on a separate core. In the auxiliary transformer there are only three cores and accordingly the deltas have to be built up from thirty-three coils which are arranged to form eighteen groups each corresponding to one of the cores of the main transformer system. Three of these groups are formed each of a single coil and the other fifteen are each formed of two coils taken from different cores of the auxiliary transformer. The positions of some of these groups are indicated by the broken line F. The grouping and dimensioning (as regards number of turns) of the individual coils of this winding of the auxiliary transformer will be seen to be similar to those employed for the primary windings of the main transformers as modified to deal with the different conditions of the bye-pass windings E which have been discussed in connection with the windings U, V of Figure 2. There is, however, this difference between the case of Figure 1 and Figure 2 that in the former we have only eighteen phases as against thirty-six in the latter. This avoids the duplication of coils. The synchronous motor M is in this case as in the case of Figure 2 connected to the windings on the auxiliary transformer. In the present case the connection is made to one of the deltas, namely, 1, 7, 13, each side of which represents a single winding. During the starting up of the apparatus this delta can serve as the secondary winding of a transformer having the primary winding N which is connected to the mains. The function of this winding N is similar to that of the winding W of Figure 2, that is to say, it is principally required for starting and may be put out of circuit after the apparatus has reached normal working conditions when the energy for driving the motor M may reach it by way of the windings D on the main transformers and the connecting wires L. It will be noted that in the figure breaks have been shown in these wires L. This is to be taken as indicating that the circuits may be broken at these points by means of switches R so that the motor may be isolated from the main transformers during starting if required.

It will be recognized that the inductive coupling between the bye-pass winding E and the secondary winding S by way of the compensating coils D is closely equivalent to the conductive connection as illustrated in the example shown in Figure 2. At the same time, it has certain practical advantages, for instance, that the voltage of the windings on the auxiliary transformer is independent of the voltage of the secondary system and the number of bye-pass winding sections need only be made equal to the number of cores in the main transformer system and not to the number of sections in the secondary winding.

The "bye-pass" effect is brought about in a somewhat different way in the case of Figure 1 than that described in connection with Figure 2. As there is no conductive connection between the secondary winding and any other winding, it is obvious that the current in the secondary winding S of Figure 1 must have the same wave form as the current which passes through the commutator connectors, that is to say, a rectangular wave form. The balance of ampere turns on the main transformer cores is in this case secured by means of the compensating coils D which carry currents which provide ampere turns which, when subtracted from the ampere turns due to the secondary winding, leave the necessary ampere turns to balance approximately at each instant the ampere turns due to the primary windings P. The currents in the compensating coils must be wholly or mainly of harmonic frequencies so that the same function as regards the interchange of energy of the higher frequencies must be performed by the auxiliary transformer in this case as in the case described in connection with Figure 2. Accordingly, while the current in the secondary winding S is not actually bye-passed the energy corresponding to its harmonic constituents is bye-passed through the windings E on the auxiliary transformer.

Owing to the connection of the synchronous motor M with the compensating coils D on the main transformers and the windings E on the auxiliary transformer, this motor may be utilized for supplying the whole or a part of the magnetizing current required by the auxiliary and the main transformers. For this purpose it is necessary to overexcite the synchronous motor.

The use of compensating coils D conductively separate from the secondary windings S of the main transformers provides the possibility of an alternative general arrangement in which there are no separate primary windings on the main cores. A winding such as N on the auxiliary transformer connected to the supply then serves as the primary for the system and this winding and the auxiliary transformer must accordingly be increased in size to deal with the larger currents which will then flow through the windings. The compensating coils D and the auxiliary transformer windings E with their connections L then form a link between the primary system and the main transformers. Looked at from another point of view the compensating coils D may be regarded as primary windings which have been modified by the aid of the auxiliary transformer so as to be capable of carrying substantial harmonic currents without distorting appreciably the current wave shape in the external primary system.

While the auxiliary transformer has been spoken of as a separate structure in the foregoing description, it is to be noted that it can in some cases be made as part of the main transformer structure by utilizing for the purpose of carrying auxiliary windings a group of the main cores. For instance, if we take the three-phase transformer comprising the cores 1, 7 and 13, on each of which there is a single primary winding, it is possible to employ this group of cores as the auxiliary transformer. The dimensions of these cores must then be settled by reference to both their main and their auxiliary transformer functions. The diagram of such a case would be provided by Figure 1 by the omission of the supply delta winding N which then becomes unnecessary.

In the arrangement illustrated in Figure 2 where the by-pass windings U, V are directly conductively connected with the secondary winding S, the bye-pass windings are conductively connected together so that interchange of energy between them can take place conductively as well as or instead of by inductive action through the agency of the auxiliary transformer cores. In the arrangement described in connection with Figure 1 in which each bye-pass winding is inductively associated with the corresponding secondary winding, there is no conductive connection between the separate deltas of the bye-pass windings. In Figure 3 is shown a case where there is both conductive and inductive connection between the bye-pass windings. There are here eighteen compensating coils D on the eighteen cores of the main transformer system connected into six deltas as in the arrangement of Figure 1, but the windings Z on the auxiliary transformer instead of being arranged to form separate deltas as in the case illustrated by Figure 1 are joined up to provide a closed ring winding. It will be seen from the vectorial representation of the arrangement of these windings Z shown in Figure 3 that they are arranged so as to provide tapping points at appropriate potential and phase differences for connection with the junction points of the sides of the deltas D. As there are only eighteen tapping points, the vectorial representation of the winding Z does not extend over the whole of a circle but forms three groups, the centres of each group being 120° apart and the tapping points on each group being 10° apart. In order to get such a relationship between the tapping points, it will in general be necessary to form each phase of the winding between a pair of adjacent tapping points of at least two sections arranged on different cores of the auxiliary transformer. The diagram indicates how by this method and by the appropriate choice of the number of turns in the sections the desired relationship between the potentials at the tapping points can be obtained.

It will be seen that the synchronous motor M is connected to three electrically equi-distant points of the closed winding Z. No separate source of supply to the auxiliary transformer has been shown in this case on account of the complication which it would introduce into the diagram. If such a supply was required it can be introduced through the tappings by which the motor M is connected to the windings Z or by providing a separate winding on the auxiliary transformer.

What we claim as our invention and desire to secure by Letters Patent is:—

1. A polyphase transforming arrangement comprising a set of windings forming an electrically symmetrical closed ring and connected to commutating gear, by-pass circuits arranged in connection with the said set of windings and including coils grouped together on transformer cores to form an auxiliary transforming arrangement, the grouping being such that the by-pass circuits offer a relatively low impedance to harmonic currents and a relatively high impedance to currents of fundamental frequency, substantially as and for the purpose set forth.

2. A polyphase transforming arrangement comprising a set of windings forming an electrically symmetrical closed ring and connected to commutating gear, an auxiliary transforming arrangement consisting of a polyphase transformer core structure and coils thereon, by-pass circuits arranged in connection with the sections of the said closed ring winding, the said by-pass circuits including coils on the auxiliary transformer the said coils being so formed as regards their respective number of turns and so grouped as regards their respective phases that the total number of ampere turns acting on any one core of the auxiliary transformer due to the by-pass current at any instant is approximately zero, substantially as described.

3. A polyphase transforming arrangement comprising a set of windings forming an electrically symmetrical closed ring and connected to commutating gear, by-pass circuits arranged in connection with the said set of windings and including coils grouped together on transformer cores to form an auxiliary transforming arrangement, a synchronous motor for driving the commutating gear and means connecting the armature winding of the synchronous motor with the by-pass coils on the auxiliary transforming arrangement, substantially as described.

4. A polyphase transforming arrangement comprising a set of windings forming an electrically symmetrical closed ring and connected to commutating gear, by-pass circuits arranged in connection with the said set of windings and including coils grouped together on transformer cores to form an auxiliary transforming arrangement, and conductive connections between the by-pass coils of the auxiliary transforming arrangement whereby they are joined together to form a closed winding.

5. A polyphase transforming arrangement comprising a polyphase core structure, a set of windings one on each of the cores of said structure, said windings being grouped together conductively to form an electrically symmetrical closed ring which is connected to commutating gear, a compensating coil on each of said cores and by-pass coils conductively connected with said compensating coils and grouped together to form an auxiliary transforming arrangement, and grouping being such that the by-pass circuits offer a relatively low impedance to harmonic currents and a relatively high impedance to currents of fundamental frequency, substantially as and for the purpose set forth.

6. A polyphase transforming arrangement comprising a polyphase core structure, a set of windings one on each of the cores of said structure, said windings being grouped together conductively to form an electrically symmetrical closed ring which is connected to commutating gear, a compensating coil on each of said cores, said compensating coils being connected in delta groups, and by-pass coils conductively connected with the junctions of said compensating coils and grouped together to form an auxiliary transforming arrangement, the grouping being such that the by-pass circuits offer a relatively low impedance to harmonic currents and a relatively high impedance to currents of fundamental frequency, substantially as and for the purpose set forth.

7. A polyphase transforming arrangement comprising a set of windings forming an electrically symmetrical closed ring and connected to commutating gear, a compensating coil inductively associated with each winding of said set, a by-pass winding conductively connected across each of said compensating coils, the said by-pass windings being grouped together to form an auxiliary transforming arrangement, the grouping being such that the by-pass circuits offer a relatively low impedance to harmonic currents and a relatively high impedance to currents of fundamental frequency, substantially as and for the purpose set forth.

8. A polyphase transforming arrangement comprising a plurality of three-phase transformer core structures, a set of windings having one section on each of the cores of said structures, the said windings being interconnected to form an electrically symmetrical closed ring which is joined to commutating gear, by-pass circuits arranged in connection with said set of windings and including coils grouped together to form an auxiliary transforming arrangement and mounted on the cores of one of the said three-phase transformer core structures, substantially as described.

In testimony whereof we affix our signatures.

JOHN EARNSHAW CALVERLEY.
WILLIAM EDEN HIGHFIELD.